United States Patent [19]
Akagi

[11] Patent Number: 5,830,592
[45] Date of Patent: Nov. 3, 1998

[54] SOLID ELECTROLYTE FUEL CELL

[75] Inventor: Kosuke Akagi, Ikoma, Japan

[73] Assignee: Osaka Gas Co., Ltd., Osaka, Japan

[21] Appl. No.: 626,622

[22] Filed: Mar. 28, 1996

[30] Foreign Application Priority Data

Mar. 29, 1995 [JP] Japan .................................. 7-071168

[51] Int. Cl.⁶ .................................................. H01M 8/10
[52] U.S. Cl. ................................ 429/34; 429/38; 429/39
[58] Field of Search ................................ 429/19, 32, 34, 429/30, 31, 38, 39, 33

[56] References Cited

U.S. PATENT DOCUMENTS

| | | | |
|---|---|---|---|
| 5,175,063 | 12/1992 | Ishihari et al. | 429/32 |
| 5,208,115 | 5/1993 | Akagi | 429/26 |
| 5,238,754 | 8/1993 | Yasuo et al. | 429/30 |
| 5,376,473 | 12/1994 | Akagi | 429/34 |
| 5,486,428 | 1/1996 | Gardner et al. | 429/19 |

FOREIGN PATENT DOCUMENTS

| | | |
|---|---|---|
| 0419163 | 3/1991 | European Pat. Off. . |
| 0437175 | 7/1991 | European Pat. Off. . |
| 0568991 | 11/1993 | European Pat. Off. . |
| 0627778 | 12/1994 | European Pat. Off. . |
| 63-211573 | 2/1988 | Japan . |
| 395868 | 4/1991 | Japan . |
| 567471 | 3/1993 | Japan . |

*Primary Examiner*—M. Nuzzolillo
*Attorney, Agent, or Firm*—Webb Ziesenheim Bruening Logsdon Orkin & Hanson, P.C.

[57] ABSTRACT

A fuel cell includes a multi-layered cell assembly having a stacked plurality of unit cells. Each unit includes a plate-like electrolyte layer having an oxygen electrode on one face thereof and a fuel electrode on the other face thereof, an oxygen-containing gas passage facing the oxygen electrode and a fuel gas passage facing the fuel electrode. An exhaust gas passage is formed adjacent end faces of the stacked unit cells. The oxygen-containing gas passage discharges oxygen-containing gas to the exhaust gas exhaust passage, whereas the fuel gas passage discharges fuel gas to the exhaust gas exhaust passage. The oxygen-containing gas passage includes an oxygen-containing gas passage extension portion for forming an oxygen-containing gas passage exit opening remotely from the end face of the unit cell, and the fuel gas passage includes a fuel gas passage extension portion for forming a fuel gas passage exit opening remotely from the end face of the unit cell.

11 Claims, 7 Drawing Sheets

SOLID ELECTROLYTE FUEL CELL

BACKGROUND OF THE INVENTION

1. Field of the Invention

The present invention relates to a solid electrolyte fuel cell, and more particularly to a fuel cell comprising a multi-layered cell assembly including a plurality of unit cells. Each unit cell includes a plate-like electrolyte layer having an oxygen electrode on one face thereof and a fuel electrode on the other face thereof, an oxygen-containing gas passage facing the fuel electrode and a fuel gas passage facing the fuel electrode. An exhaust gas exhaust passage is formed adjacent end fares of the stacked unit cells. The oxygen-containing gas passage discharges oxygen-containing gas to the exhaust gas exhaust passage while the fuel gas passage discharges fuel gas to the exhaust gas exhaust passage, respectively.

2. Description of the Related Art

With the above-described fuel cell in operation, the exhaust gas exhaust passage receives oxygen-containing gas from the oxygen-containing gas passage and fuel gas from the fuel gas passage, respectively, so that in the exhaust gas exhaust passage the oxygen-containing gas and the fuel gas are combusted and the multi-layered cell assembly is heated by heat generated by this combustion.

FIGS. 9 and 10 show a conventional fuel cell of the above-noted type. In this, an exit opening (so) of the oxygen-containing gas passage (s) and an exit opening (fo) of the fuel gas passage (f) are opened in a same end face of the unit cell C (see e.g. unexamined Japanese patent publication: Hei. 5-315004).

In the figures, a reference mark NC denotes a multi-layered cell assembly composed of a plurality of vertically stacked unit cells C. Each unit cell C includes a plate-like electrolyte layer 1 having an oxygen electrode 2 affixed to one face thereof and a fuel electrode 3 affixed to the other face thereof. Further, an oxygen-containing gas passage (s) is formed facing the oxygen electrode 2 and a fuel gas passage (f) is formed facing the fuel electrode 3. A reference mark E denotes an exhaust gas exhaust passage formed adjacent side end faces of the stacked cells C. A mark (si) denotes an entrance opening of the oxygen-containing gas passage (s), and a mark (fi) denotes an entrance opening of the fuel gas passage (f), respectively. A mark S denotes an oxygen-containing gas supply passage for supplying oxygen-containing gas into the entrance opening (si) of the oxygen-containing gas passage (s), and a mark F denotes a fuel gas supply passage for supplying fuel gas into the entrance opening (fi) of the fuel gas passage (f), respectively.

In the case of the conventional fuel cell described above, the exit opening of the oxygen-containing gas passage and the exit opening of the fuel gas passage are opened in the same end face of the cell, so that the oxygen-containing gas discharged from the exit opening of the oxygen-containing gas passage and the fuel gas discharged from the exit opening of the fuel gas passage are merged together immediately after being discharged to be combusted. Accordingly, there occurs abnormal rise in temperature in the vicinity of the end face of the unit cell defining the exit opening of the oxygen-containing gas passage and the exit opening of the fuel gas passage, and such abnormal temperature rise tends to degrade the cell.

The present invention attends to the above shortcoming of the prior art, and its primary object is to provide a fuel cell having improved durability by restricting abnormal temperature rise in unit cell through ingenious modification of the constructions of the oxygen-containing gas passage and of the fuel gas passage.

SUMMARY OF THE INVENTION

For fulfilling the above-noted object, a fuel cell, according to the present invention, comprises:

a multi-layered cell assembly including a stacked plurality of unit cells, each unit cell including a plate-like electrolyte layer having an oxygen electrode on one face thereof and a fuel electrode on the other face thereof, an oxygen-containing gas passage facing the oxygen electrode and a fuel gas passage lacing the fuel electrode;

an exhaust gas exhaust passage formed adjacent end faces of the stacked unit cells;

the oxygen-containing gas passage discharging oxygen-containing gas to the exhaust gas exhaust passage;

the fuel gas passage discharging fuel gas to the exhaust gas exhaust passage;

Wherein the oxygen-containing gas passage includes an oxygen-containing gas passage extension portion for forming an oxygen-containing gas passage exit opening remotely from the end face of the unit cell; and the fuel gas passage includes a fuel gas passage extension portion for forming a fuel gas passage exit opening remotely from the end face of the unit cell.

With the above construction, due to the oxygen-containing gas passage extension portion, the exit opening of the oxygen-containing gas passage is formed away from the end face of the unit cell, and similarly, due to the fuel gas passage extension portion, the exit opening of the fuel gas passage too is formed away from the end face of the unit cell. Accordingly, the oxygen-containing gas discharged from the exit opening of the oxygen-containing gas passage and the fuel gas discharged from the exit opening of the fuel gas passage are merged and combusted at a position away from the end face of the unit cell.

As a result, it has become possible to restrict the abnormal temperature rise in the cell and consequently to improve the durability of the cell.

According to a further aspect of the invention, the cell further comprises a passage forming member for forming, on the side facing the oxygen electrode, the oxygen-containing gas passage between this passage forming member and the oxygen electrode;

in the multi-layered cell assembly, the plurality of unit cells are stacked with a predetermined distance therebetween so as to form the fuel gas passage between the adjacently stacked unit cells;

a spacer member is disposed between each adjacently stacked pair of unit cells for maintaining the predetermined distance therebetween, with the spacer member being projected on the side of the exhaust gas exhaust passage;

said fuel gas passage extension portion comprises a through portion defined in said spacer member extending from an end face of the spacer member on the side of the fuel gas passage to the other end face thereof on the side of the exhaust gas exhaust passage; and said oxygen-containing gas passage extension portion is formed between the adjacently stacked spacer members.

With the above construction, when a plurality of unit cells each having the passage forming member forming the oxygen-containing gas passage on the side facing the oxygen electrode are stacked with a predetermined distance therebetween, one of the adjacently stacked unit cell has its fuel electrode facing the passage forming member of the other unit cell, whereby the fuel passage may be formed between these adjacently stacked unit cells.

The spacer member disposed between the adjacently stacked unit cells for maintaining a predetermined distance therebetween is disposed to project on the side of the exhaust gas exhaust passage, and this spacer member defines a through portion extending from one end face of the member facing the fuel gas passage to the other end face thereof facing the exhaust gas exhaust passage, so that this through portion may function as a fuel gas passage extension portion.

Further, the spacer member is disposed so as to project from the end face of the unit cell on the side of the exhaust gas exhaust passage, so that the projection portions of the adjacently stacked unit cells on the exhaust gas exhaust passage together form the oxygen-containing gas passage extension portion.

That is to say, each unit cell includes only the passage forming member for forming the oxygen-containing gas passage; then, as a plurality of these unit cells are stacked with the predetermined distance therebetween maintained by using the spacer members, the multi-layered cell assembly is formed and also the fuel passages are formed as well at the same time.

Further, the fuel gas passage extension portion and the oxygen-containing gas passage extension portion are formed by utilizing this spacer member.

As a result, in addition to the simple cell assembly construction or simple fuel cell construction described above in which the multi-layered cell assembly and also the fuel gas passage may be formed only by stacking a plurality of unit cells having only the passage forming member for forming the oxygen-containing gas passage with the predetermined distance therebetween by using the spacer member, the fuel gas passage extension portion and the oxygen-containing gas extension portion, i.e. the essential features of the present invention, may be provided at low costs.

According, to a still further aspect of the invention, the projecting portions of the adjacent spacer members on the side of the exhaust gas exhaust passage are overlapped with each other to form an exhaust passage forming portion having a thickness corresponding to the sum of the distance between the adjacent unit cells and the thickness of the unit cell;

the exhaust passage forming port ion defines a hole extending through the stacking direction of the unit cells and communicating with the exit opening of the oxygen-containing gas passage and the exit opening of the fuel gas passage;

a plurality of said holes are communicated to each other in the stacking direction to together form the exhaust gas exhaust passage.

With the above-construction, the projecting portions of the spacer members on the side of the exhaust gas exhaust passage are overlapped with each other to form the exhaust passage forming portion having a thickness corresponding to the sum of the distance between the adjacent unit cells and the thickness of the unit cell; and this exhaust passage forming portion defines a hole extending through the stacking direction of the unit cells and communicating with the exit opening of the oxygen-containing gas passage and the exit opening of the fuel gas passage. Then, the multi-layered cell assembly is constructed by using a plurality of these spacer members having such exhaust passage forming portions, the holes of the stacked exhaust passage forming portions collectively provide one continuous passage extending in the stacking direction, and this passage may act as the stacking gas exhaust passage.

As a result, with the simple unit cell construction and simple fuel cell construction, the exhaust gas exhaust passage may be formed at the same time as the formation of the multi-layered cell assembly. Accordingly, the entire construction of the fuel cell may be simple and also the assembly of the fuel cell may be facilitated.

According to a still further aspect of the invention, the spacer member defines, in a face thereof contacting the adjacent unit cell, a groove to be filled with sealing material.

With the above construction, a groove is defined in the face of the spacer member contacting the adjacent unit cell and this groove is filled with sealing material. Hence, the spacer member and the adjacent unit cell may be sealed together with a sufficient amount of sealing material, whereby the sealed condition therebetween may be improved. With this improved sealed condition, it becomes possible to effectively prevent leakage of the fuel gas through gap between the adjacent cell and the spacer member and then the end face of the unit cell into the oxygen-containing gas passage.

Eventually, it becomes possible to reliably prevent inadvertent combustion of the oxygen-containing gas and the fuel gas adjacent the end face of the unit cell due to such leakage of the fuel gas. Accordingly, the durability of the unit cell may be further improved.

According to a still further aspect of the invention, the unit cell has a rectangular plan-view configuration having four side faces;

the oxygen-containing gas passage extension portion and the fuel gas passage extension portion are formed in one of the four side faces;

an entrance opening of the oxygen-containing gas passage is defined in the opposite end face to the end face forming the oxygen-containing gas passage extension portion and the fuel gas passage extension portion; and an entrance opening of the fuel gas passage is defined in each of the end faces adjacent the end face forming the oxygen-containing gas passage extension portion and the fuel gas passage extension portion.

With the above construction, when a plurality of unit cells each having the rectangular configuration are stacked to form the multi-layered cell assemble, this cell assembly has a rectangular cylindrical configuration. Then, the exit openings of the oxygen-containing gas passages and the exit openings of the fuel gas passages of the respectively cell units are opened in one side face of this rectangular cylindrical multi-layered cell assembly, and the entrance openings of the oxygen-containing gas passages of the respective cell units are opened in the opposite side face. Further, the entrance openings of the fuel gas passages of the respective cell units are opened in each of the side faces adjacent the side face defining the exit openings of the oxygen-containing gas passages and the exit openings of the) fuel gas passages.

Then, of this multi-layered cell assembly, the oxygen-containing gas supply passage for supplying the oxygen-containing gas into the entrance openings of the respective oxygen-containing gas passages may be provided adjacent the side face of the assembly defining the entrance openings of the oxygen-containing gas passages; the fuel gas supply passage for supplying the fuel gas into the entrance openings of the respective fuel gas passages may be provided adjacent the side face of the assembly defining the exit openings of the respective oxygen-containing gas passages and the exit openings of the respective fuel gas passages; and the exhaust gas exhaust passage for discharging the oxygen-containing gas from the exit openings of the oxygen-containing gas passages and the fuel gas from the exit openings of the fuel gas passages may be provided adjacent each side face defining the exit openings of the oxygen-containing gas passages or the exit openings of the fuel gas passages.

with the above, adjacent each side face of the multi-layered cell assembly, there is provided one of the oxygen-containing gas supply passage, fuel gas supply passage and the exhaust gas exhaust passages. Accordingly, these oxygen-containing gas supply passage, fuel gas supply passage and the exhaust gas exhaust passages may be formed in a simple manner. Consequently, the overall construction of the fuel cell may be further simplified and the assembly of the fuel cell may be further facilitated.

Further and other objects, features and effects of the invention will become more apparent from the following more detailed description of the embodiments of the invention with reference to the accompanying drawings.

DETAILED DESCRIPTION OF THE PREFERRED EMBODIMENTS

A fuel cell according to one preferred embodiment of the present invention will be described in details with reference to FIGS. 1 through 7.

Figure 1:
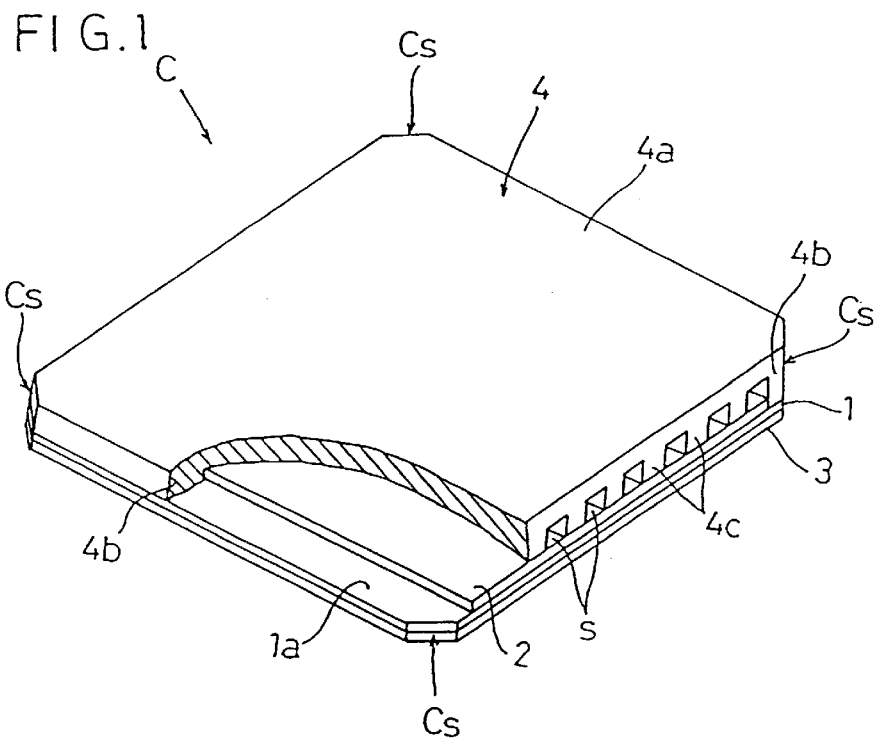
FIG. 1 is a perspective view of a unit cell of a fuel cell according to one preferred embodiment of the invention.
Figure 2:
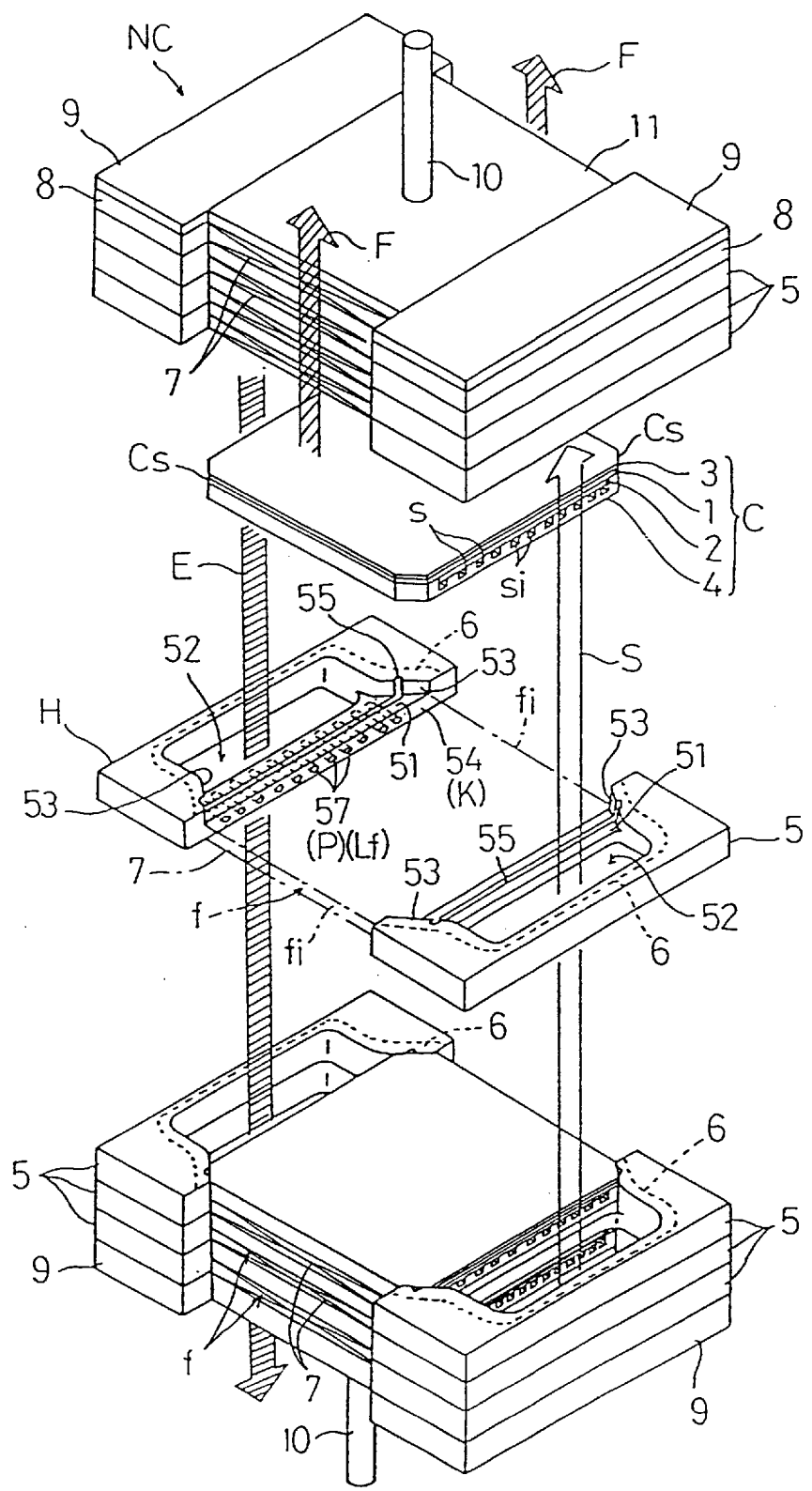
FIG. 2 is an exploded perspective view showing a multi-layered construction of a cell assembly of the fuel cell.

As shown in FIG. 2, this fuel cell comprises a cell assembly NC including a plurality of unit cells C stacked vertically. More particularly, each unit cell C, as better shown in FIG. 1, includes a plate-like electrolyte layer 1, an oxygen electrode 2 affixed to one face of the electrolyte layer 1, and a fuel electrode 3 affixed to the other face of the electrolyte layer 1. Further, an oxygen-containing gas passage s is formed to face the oxygen electrode 2 and a fuel gas passage f is formed to face the fuel electrode 3.

An exhaust gas passage E is formed in the vicinity of one of the four end faces of the unit cell and an oxygen-containing gas supply passage S is formed in the vicinity of the opposite end face of the unit cell. And, fuel gas supply passages F are formed in the vicinities of the other two opposed end faces of the unit cell, respectively.

The oxygen-containing gas passage s discharges oxygen-containing gas supplied from the oxygen-containing gas supply passage S into the exhaust gas exhaust passage E. Whereas, the fuel gas passage f discharges fuel gas supplied from the fuel gas supply passages F into the exhaust gas exhaust passage E.

Next, the unit cell C will be described in details with reference to FIG. 1.

The unit cell C includes an electrically conductive separator 4 as a passage forming member for forming, on the side facing the oxygen electrode 2, the oxygen-containing gas passage s between this member and the oxygen electrode 2.

That is to say, this unit cell C comprises a rectangular, three-layer construction, in which the oxygen electrode 2 in the form of a film or plate is integrally affixed to the solid electrolyte layer 1 in such a manner as to leave, at a pair of opposed side edges of the layer 1, a pair of electrolyte-exposed portions 1a extending along the entire edges. On the other entire or substantially entire face of the solid electrolyte layer 1, there is integrally affixed the fuel electrode 2 in the form of a film or plate. Then, this unit cell C receives an electromotive force from the oxygen electrode 2 and the fuel electrode 3.

The electrically conductive separator 4 comprises an integral member formed of an electrically conductive material and consisting essentially of a planar portion 4a, a pair of band-like projections 4b disposed respectively at the opposed side ends of the planar portion 4a and of a plurality of ridges 4c formed between the opposed band-like projections 4b. Then, in the unit cell C, the conductive separator 4 has its pair of band-like projections 4b affixed respectively to the opposed electrolyte exposed portions 1a with placing the plural ridges 4c in contact with the oxygen electrode 2.

As the oxygen electrode 2 and the conductive separator 4 are conductively connected together in the above-described manner, there are formed a plurality of oxygen-containing gas passages s between the oxygen electrode 2 and the conductive separator 4, the gas passages s being opened at the pair of opposed end faces of the unit cell C. Accordingly, these oxygen-containing gas passages s are closed at the other opposed pair of end faces of the unit cell C.

The solid electrolyte layer 1 is formed of appropriate material such as tetragonal crystalline $ZrO_2$ having Yt (yttria: $Y_2O_3$) solid-fused therein in the order of 3 mol %. The oxygen electrode 2 is formed such material as $LaMnO_3$. The fuel electrode 3 is formed of cermet of Ni and $ZrO_2$ or the like.

The conductive separator 4 is formed of appropriate material having resistance against oxidation and reduction such as $LaCrO_3$.

Incidentally, in the following description, in the unit cell C, the edges thereof where the oxygen-containing gas passages s are opened will be referred to as 'opened edges', and the end faces thereof where the oxygen-containing gas passages s are opened will be referred to as 'opened end faces', and the other end faces thereof where the oxygen-containing gas passages s are closed will be referred to as 'closed end faces', respectively.

The four corner portions respectively of the conductive separator 4, solid electrolyte layer 1 and fuel electrode 3 are cut off so as to provide inclined portions Cs at the opposed ends of the closed end faces of the unit cell C. The inclined portions Cs will be described in greater details later.

Next, with reference to FIGS. 2 through 5, there will be described the multi-layered construction for forming the cell assembly NC by vertically stacking a plurality of unit cells C.

In the cell assembly NC, for forming the fuel gas passage f between the adjacently stacked unit cells C, a plurality of unit cells C each having the above-described construction are stacked vertically with a predetermined space therebetween.

More particularly, in this cell assembly NC, each unit cell C has its opposed opened edges thereof held by means a pair of cell holders 5, and a plurality of these cell holders 5 are stacked vertically to constitute together the cell assembly NC.

Next, the cell holder 5 will be described in details.

This cell holder 5 is a rectangular, C-shaped plate-like construction defining a cut-in portion 51 for receiving each opened edge of the unit cell C and a through hole 52 extending through along the stacking direction of the unit cell C. The cut-in portion 51 has a depth substantially corresponding to the thickness of the unit cell C. Further, this cut-in portion 51 includes a pair of opposed abutment faces 53 against which the closed end faces of the unit cell C inserted into the cut-in portion 51 are placed in abutment. The abutment faces 53 are formed with inclinations relative to the stacking direction of the unit cell C such that these opposed abutment faces 53 extend closer to each other in the direction away from the respective opened edges of the unit cell C. In correspondence therewith, at each of the opposed ends of the closed end faces of the unit cell C, there is formed an inclined portion Cs to be gaplessly fitted to the inclined abutment face 53.

Figure 6:
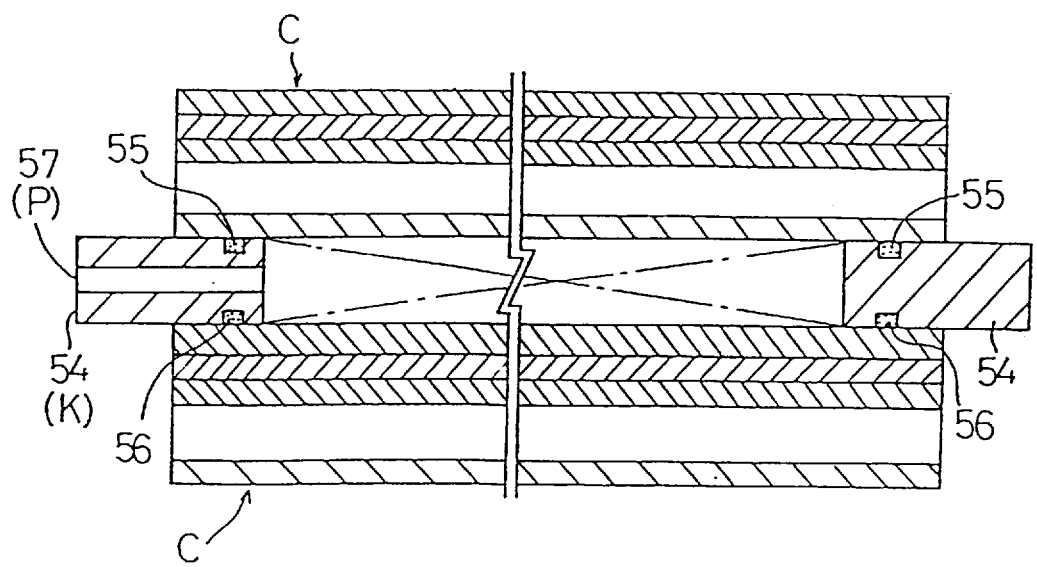
FIG. 6 is a side view in vertical section of a principal portion of the fuel cell.

Each cut-in portion 51 of the cell holder 5, as shown in FIG. 6, defines, in an inner surface thereof, a groove 55 to be filled with a sealing material to be described later. Further, on the opposite face of the cell holder 5 to the face thereof defining the cut-in portion 51, there is formed a similar groove 56. These grooves 55, 56 are formed to overlap with each other in the unit-cell stacking direction.

By the formation of the cut-in portion 51, the cell holder 5 obtains a thin portion 54. Then, one of the opposed pair of cell holders 5 defines, in this thin portion 54, a series of through holes 57 extending between an end face facing the through hole 52 and the opposite end face.

Then, the unit, cells C are vertically stacked with the respective opened edges thereof fitted to the cut-in portions 51 of the opposed pair of cell holders 5.

That is to say, the pair of thin portions 54 of the opposed cell holders 5 function to maintain the predetermined gap between the adjacently stacked unit cells C, thereby forming the fuel gas flow passage f between the unit cells.

For setting the opened edges of the unit cell C to the cut-in portion 51 of the cell holder 5, the respective inclined portions Cs formed at the opposed closed end faces of the unit cell C are gaplessly fitted to the abutment faces 53 and back faces of the adjacently stacked cell holders 5 are placed into sealed contact with each other, whereby the oxygen-containing gas passages s and the fuel gas passage f are sectioned from each other in the gas sealed condition. Further, the sealing material having heat resistance and electrically insulating property is filled into the grooves 55, 56, so as to reliably maintain the gas-sealed condition.

As described above, when the plurality of unit cells C are stacked with the respective opened edges thereof being fitted to the opposed pairs of cell holders 5, there are formed two passages extending in the unit-cell stacking direction and communicating the through holes 57 of the stacked cell holders 5 with each other. The one passage formed on the side of the cell holders 5 not having the through holes 57 is used as an oxygen-containing gas passage S for supplying oxygen-containing gas into the oxygen-containing gas passages s. The other passage formed on the other side of the cell holders 5 having the through holes 57 is used as an exhaust gas passage E for discharging the oxygen-containing gas from the oxygen-containing gas passages s and discharging also the fuel gas from the fuel gas passages f. Incidentally, between the adjacently stacked cell holders 5 too, the sealing material is filled, as denoted by a broken line 6 in FIG. 2, so as to maintain respectively the oxygen-containing gas supply passage S and the exhaust gas exhaust passage E gas-sealed from the outside.

Further, the space between the adjacently stacked unit cells C, i.e. the fuel gas passage f is filled with a soft conductive material 7 having a gas permeability, whereby the adjacent unit cells C are conductively connected to each other.

The soft conductive material 7 can be e.g. a felt material such as of Ni having good heat resistance and reduction resistance. The cell holder 5 is formed of ceramic material having good heat resistance and electrical insulating property.

Accordingly, the thin portion 54 functions as a spacer member K disposed between adjacent unit cells C and maintaining a predetermined space therebetween. This spacer member 5 is disposed so as to project on the side of the exhaust gas exhaust passage E. Also, the other portion of the cell holder 5 than the thin portion 54 functions as an exhaust passage forming portion H having a thickness substantially equal to the sum of the space between the adjacent cell units c and the thickness of the unit cell C.

The through holes 57 are formed so as to extend from the end face of the thin portion 54 on the side of the fuel gas passage f to the other face thereof facing the exhaust gas exhaust passage E, so that these through holes 57 together function as through portions P. Further, these through holes 57 function as a fuel gas passage extension portion If extending away from the end face of the unit cell C, so that an exit opening fo of the fuel flow passage f may be located away from the end face of the unit cell C as the opened end of the passage f is extended in this direction by the extension portion Lf.

In other words, the opening of each through hole 57 exposed to or facing the exhaust gas exhaust passage E functions as an 'extended' exit opening of the fuel flow passage f.

On the other hand, an exit opening so of each oxygen-containing gas passage s is formed between the end faces of the adjacently stacked thin portions 54 facing the exhaust gas exhaust passage E. Therefore, these adjacently stacked thin portions 54 function as an oxygen-containing gas extension portion Ls extending away from the end face of the unit cell C so that the exit opening so may be located away from the end face of the unit cell C.

Of the opposed openings of each oxygen-containing gas passage s, the one opening facing the oxygen-containing gas supply passage S functions as an entrance opening si of the oxygen-containing gas passage s. And, the gap formed between the closed end faces of the adjacently stacked unit cells C is utilized as an entrance opening fi of the fuel gas passage f.

That is to say, the oxygen-containing gas passage extension portion Ls and the fuel gas passage extension portion Lf are provided to one of the four end faces. The entrance opening si of the oxygen-containing gas passage s is provided in the end face facing the above end face provided with the oxygen-containing gas passage extension portion Ls and the fuel gas passage extension portion Lf. The entrance opening fi of the fuel gas passage f is provided to each of the opposed end faces adjacent the above end face having the oxygen-containing gas passage extension portion Ls and the fuel gas passage extension portion Lf.

An opposed pair of spacer plates 8 are placed on the top of the multi-layered stacked assembly including the unit cells C vertically stacked with the opposed opened edges thereof being fitted to the cut-in portions 51 of the opposed pairs of cell holders 5 as described above. Further, on the top of the spacer plates 8 and also on the bottom of the multi-layered stacked assembly, there are respectively attached an opposed pair of collector plate holding plates 9, so that these top and bottom collector plate holding plates 9 seal the oxygen-containing, gas supply passage S and the exhaust gas exhaust passage E.

More specifically, each of the spacer plates 8 and collector plate holding plates 9 has planar configuration and dimensions substantially corresponding to those of the cell holder 5, so that these plates 8, 9 are placed in an overlapped manner on the corresponding cell holder 5. Further, the spacer plate 8 defines a hole 81 hating a planar configuration matched witch that of the hole 52 of the cell holder 52. And, one of the opposed pair of spacer places 8 defines a plurality of through holes 82 similar to the holes 57 defined in the thin portion 54 of the cell holder 5.

Figure 7:
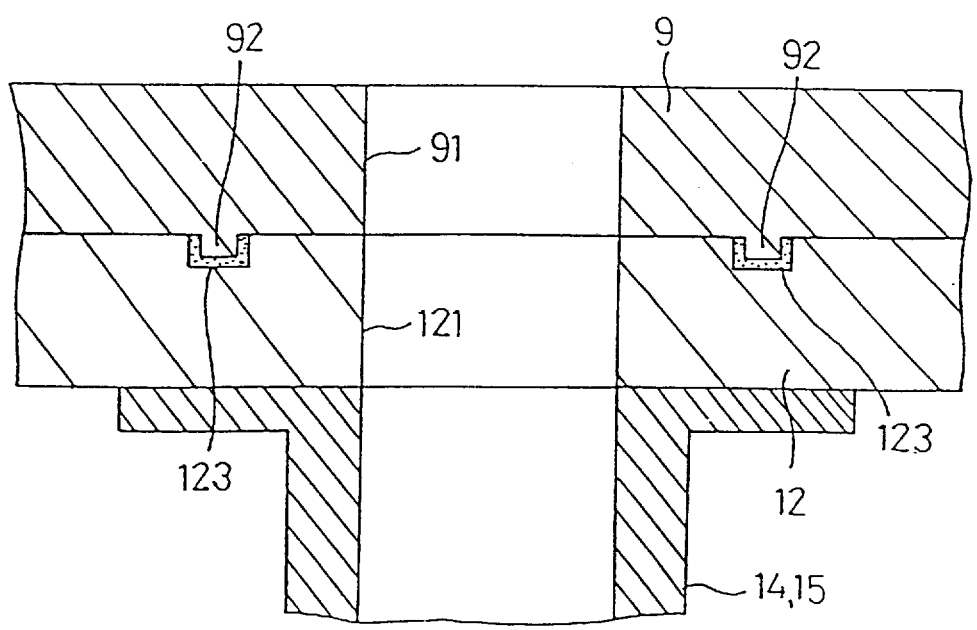
FIG. 7 is a side view in vertical section of a further principal portion of the fuel cell.

As shown also in FIG. 7, each of the bottom pair of collector plate holding plates 9 defines a through hole 91 and an annular projection 92. The details of this construction will be described later.

Between each opposed pair of collector plate holding plates 9 and placed in contact with the soft conductive material 7, there is attached a collector plate 11 having a terminal rod 10 fixed thereto, so that an output power may be taken from these opposite terminal rods 10.

The spacer plates 9 and the collector plate holding plates 9 are formed of ceramic material having good heat resistance and electrically insulating property.

The above concludes the description of the construction of the cell assembly NC.

Figure 3:
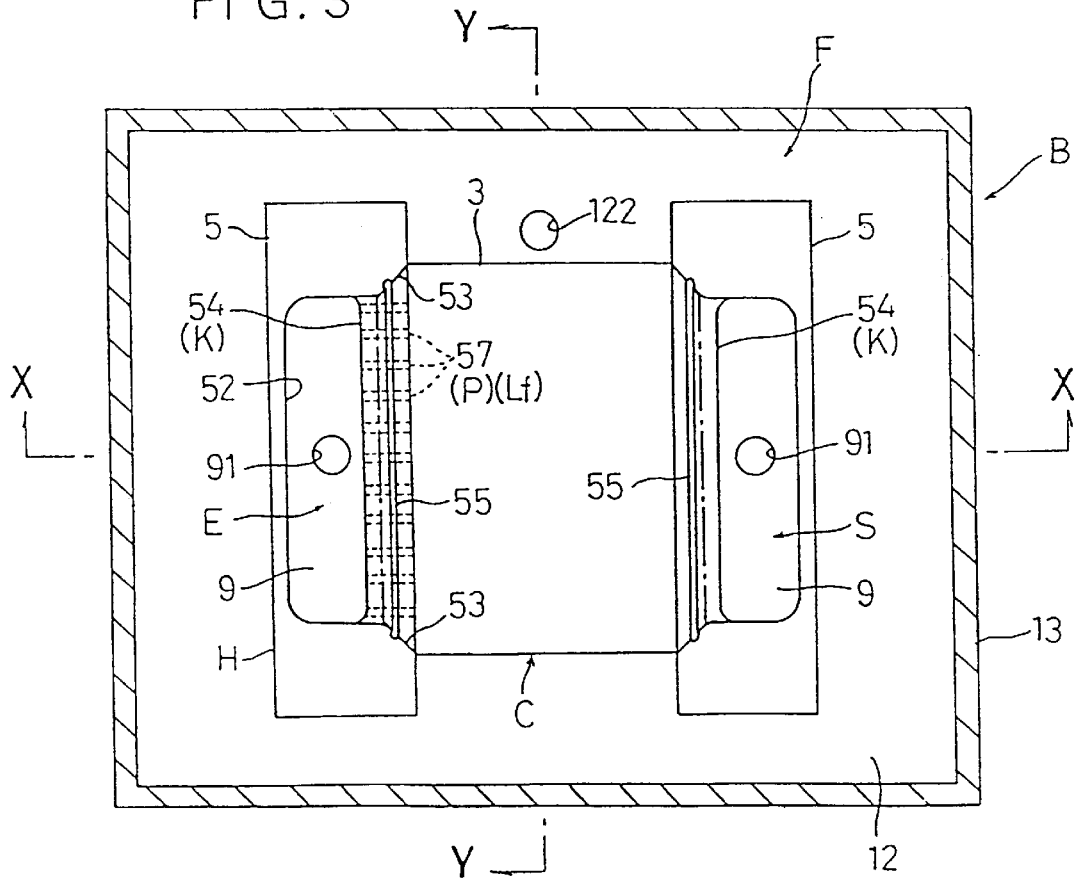
FIG. 3 is a horizontal section of the fuel cell.
Figure 4:
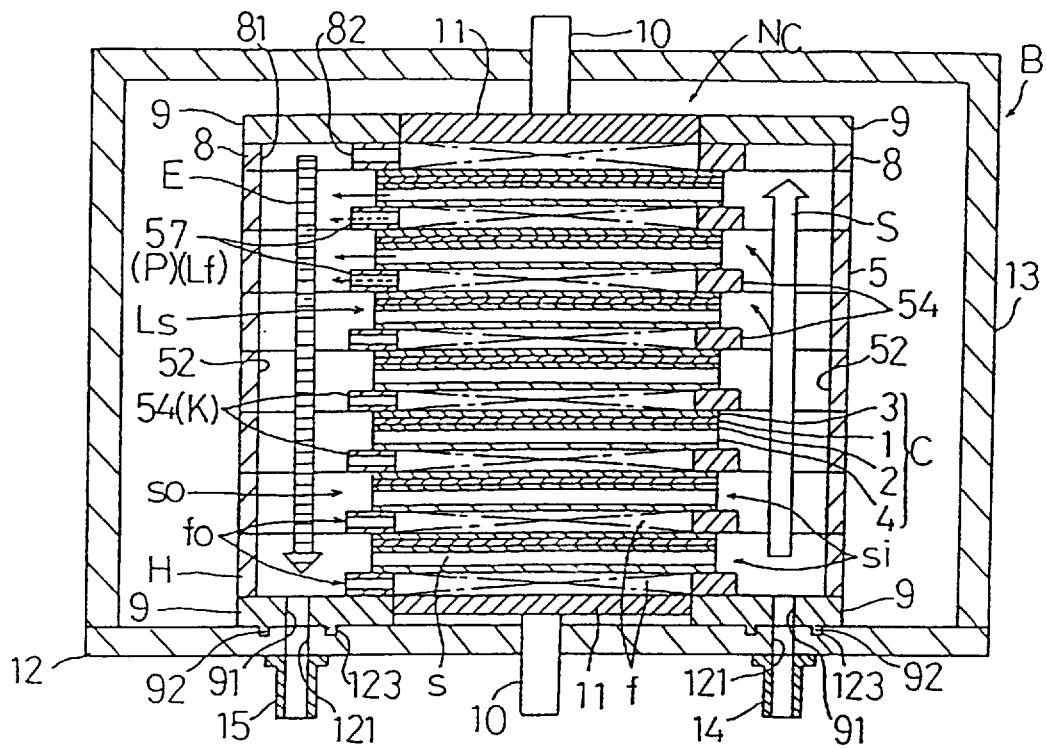
FIG. 4 is a section taken along a line X—X in FIG. 3.
Figure 5:
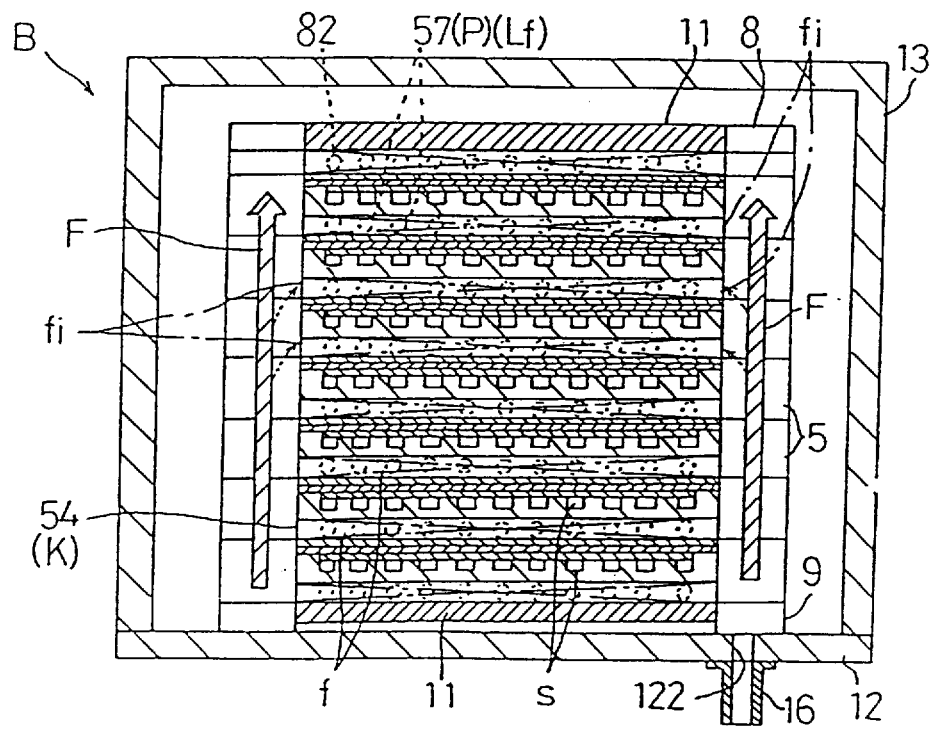
FIG. 5 is a section taken along a line Y—Y in FIG. 3.

Next, the entire construction of the fuel cell will be described with reference to FIGS. 3 through 5.

The cell assembly NC having the above-described construction is mounted on a mounting table 12. More particularly, the cell assembly NC is accommodated within an angular cylindrical member 13 having a closed top and an opened bottom and this cylindrical member 13 accommodating the cell assembly NC and in the mentioned orientation is mounted on the mounting table 12.

That is, the mounting table 12 and the angular cylindrical member 13 together constitute a box member B, in which the cell assembly NC is housed.

The one terminal rod 10, i.e. the top terminal rod, extends through the closed top of the angular cylindrical member 13 in a gas-sealed condition to project to the outside of the fuel cell. The other terminal rod 10, i.e. the bottom terminal rod, extends through the mounting table 12 at a gas-sealed condition to project to the outside of the fuel cell.

As the entrance openings f1 of the fuel gas passages f are opened to the inner space of the box member B, so that this inner free space of the box member B is utilized as the fuel gas supply passage F for supplying fuel gas into the fuel gas passages f.

As also shown in FIG. 7, the through hole 121 defined in the mounting table 12 to face the oxygen-containing gas supply passage S is connected and communicated with the oxygen-containing gas supply pipe 14. Another through hole 121 defined in the mounting table 12 to face the exhaust gas exhaust passage E is connected and communicated with an exhaust gas exhaust pipe 12. A still further through hole 122 defined also in the mounting table 12 is connected and communicated with a fuel gas supply pipe 16.

Next, some other embodiments of the invention will be described.

(1) In the foregoing embodiment, the through portion P is constituted from the plurality of through holes 57. Yet, the specific construction of this through portion P is not limited thereto, but may vary as desired or appropriate. For instance, the through portion P may be constituted from a single wide through hole having a wide flattened opening width extending in the opposing direction of the opposed pair of abutment faces 53.

(2) The multi-layered stacked construction for constructing the cell assembly NC from a plurality of vertically stacked unit cells C is not limited to the specific construction disclosed in the foregoing embodiment. Any other construction may be employed instead, when necessary or appropriate.

Figure 8:
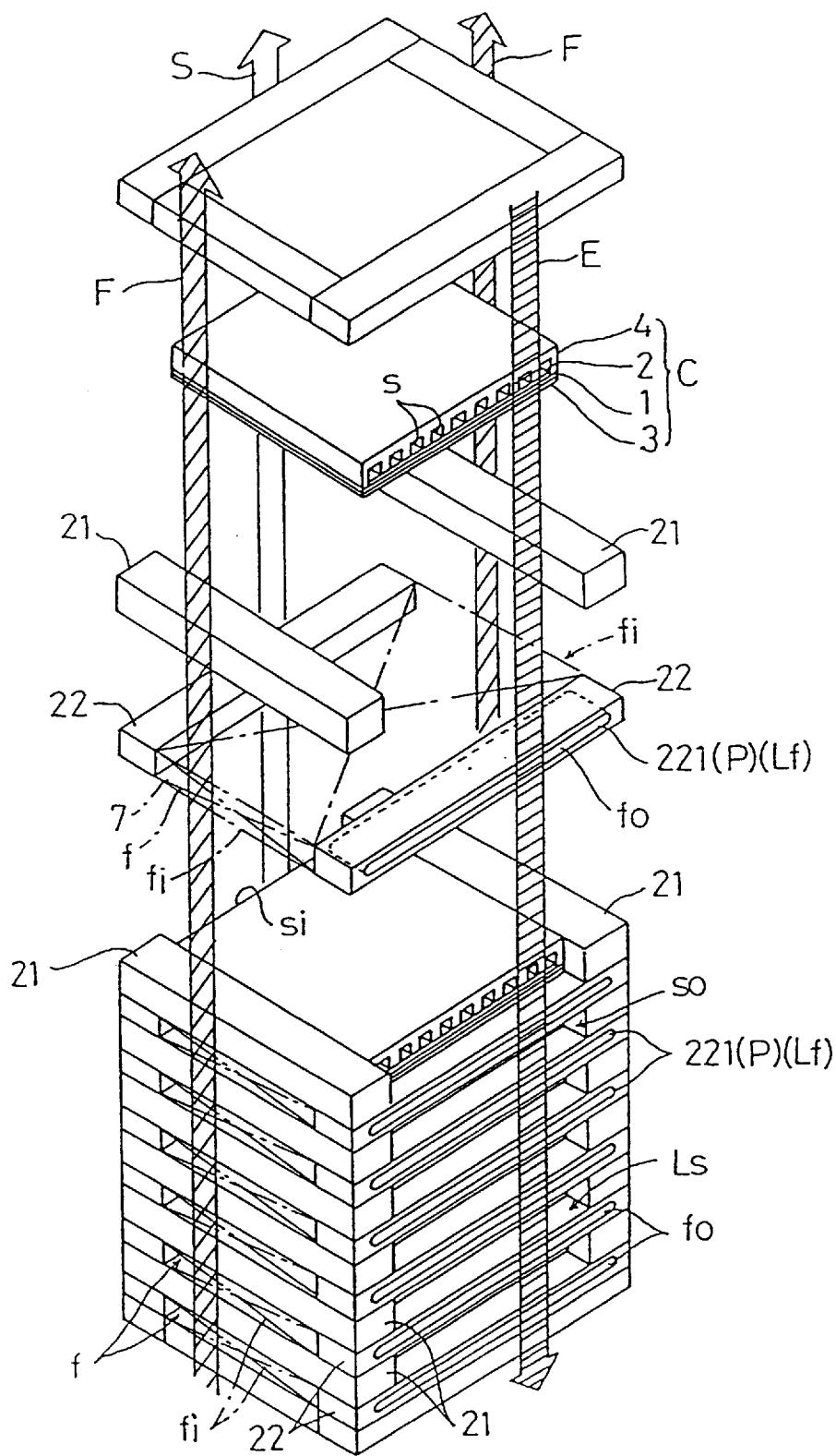
FIG. 8 is an exploded perspective view showing a multi-layered construction of a cell assembly of a fuel cell according to a further embodiment of the invention.
Figure 9:
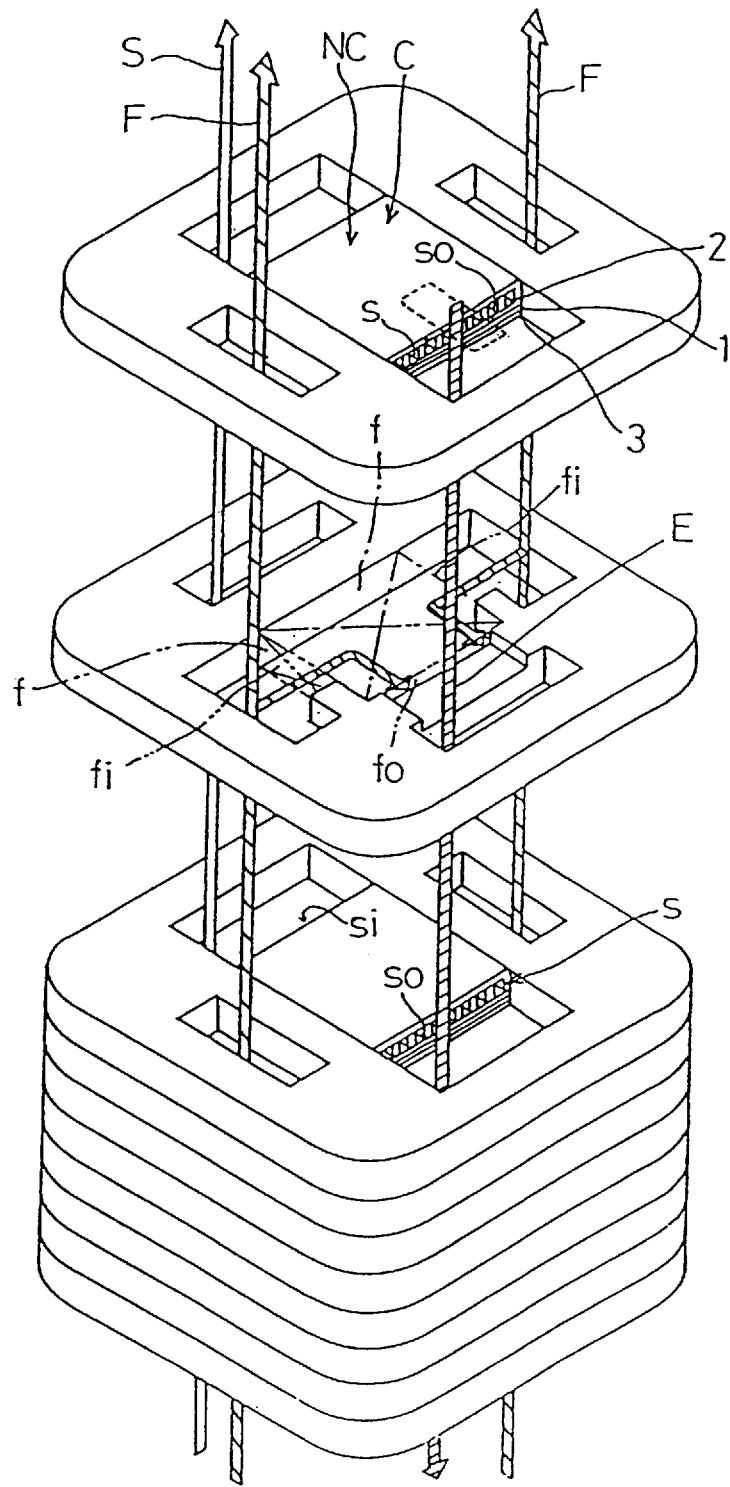
FIG. 9 is an exploded perspective view showing a multi-layered construction of a cell assembly of a fuel cell according to the prior art.
Figure 10:
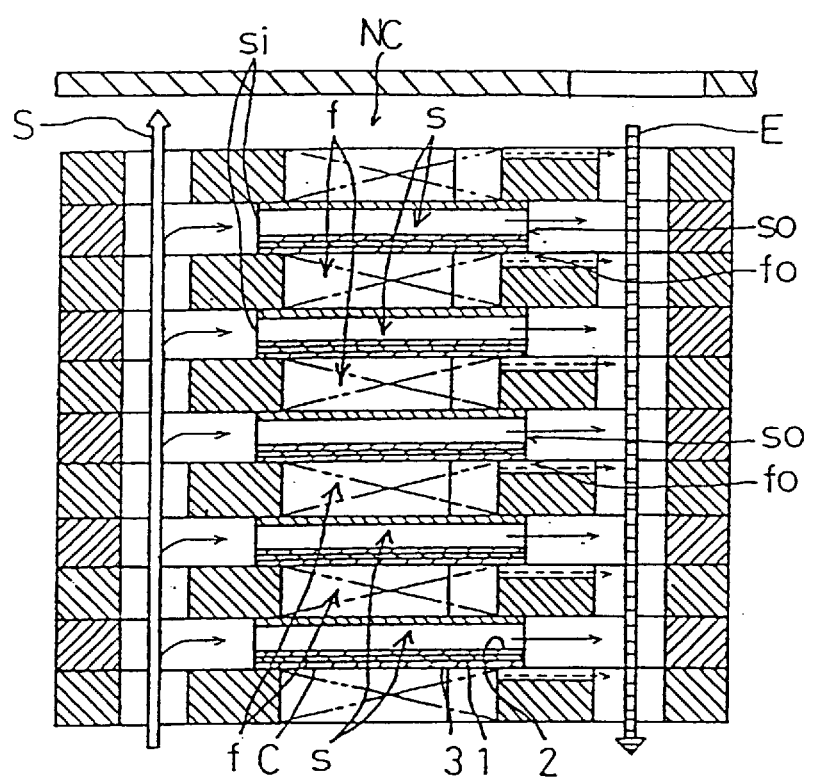
FIG. 10 is a side view in vertical section of the conventional fuel cell.

For instance, as shown in FIG. 8, a pair of pillar members 21 each having a thickness substantially equal to the thickness of the unit cell C and a length longer than the same are placed in gapless contact respectively with the opposed closed end faces of the cell unit C. And, a pair of spacer members 22 each having a length longer than the length of the unit cell C are placed in gapless contact respectively with the opposed opened ends of the unit cell C. Also, the opposed ends of the spacer members 22 are gaplessly placed over the opposed ends of the pillar members 21. Then, on these spacer members 22, there are placed a further pair of pillar members 21 placed in gapless contact with the cell and its pair of closed end faces. With repetition of the above processes, a cell assembly NC may be formed.

Of the above, one of the spacer members 22 defines a through hole 221 as the through portion P, so that this through hole 221 constitutes the fuel gas passage extension portion Lf. Further, between the adjacently stacked spacer members 22, the oxygen-containing gas passage extension portion Ls is formed.

(3) In the foregoing embodiment, for constructing each unit cell C, the conductive separator 4 is affixed to the oxygen electrode 2 of the three-layer assembly. Instead, the unit cell C may be constructed with the conductive separator 4 being affixed to the fuel electrode 3 of the three-layer assembly. Then, a plurality of these unit cells C constructed in this manner are vertically stacked in the same manner as the foregoing embodiment to constitute the cell assembly NC. In this case, the oxygen-containing gas passage s is formed between the adjacently stacked unit cells C. Further, the through hole 57 defined in the thin portion 54 of the cell holder 5 acts as the oxygen-containing gas passage extension portion Ls. Whereas, the adjacently stacked pair of thin portions 54 or the space therebetween acts as the fuel gas passage extension portion Lf.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced there in.

What is claimed is:

1. A fuel cell comprising:

a multi-layered cell assembly including a stacked plurality of unit cells, each unit cell including a substantially planar electrolyte layer having an oxygen electrode on one face thereof and a fuel electrode on the other face thereof, an oxygen-containing gas passage facing the oxygen electrode and a fuel gas passage facing the fuel electrode;

a plurality of the unit cells being stacked with a distance therebetween such that the fuel gas passage or the oxygen-containing gas passage is formed between each adjacent stacked pair of unit cells, thus forming the multi-layered cell assembly;

an exhaust gas exhaust passage formed adjacent end faces of the stacked unit cells;

a spacer member disposed between each adjacently stacked pair of unit cells for maintaining the distance therebetween, with the spacer member being projected on the side of the exhaust gas exhaust passage;

the oxygen-containing gas passage configured to discharge oxygen-containing gas to the exhaust gas exhaust passage;

the fuel gas passage configured to discharge fuel gas to the exhaust gas exhaust passage;

wherein the oxygen-containing gas passage includes an oxygen-containing gas passage extension portion for forming an oxygen-containing gas passage exit opening remotely from the end face of the unit cell;

wherein the fuel gas passage includes a fuel gas passage extension portion for forming a fuel gas passage exit opening remotely from the end face of the unit cell; and wherein said fuel gas passage extension portion or said oxygen-containing gas passage extension portion comprises at least one through portion defined in said spacer member extending from an end face of the spacer member on the side of the fuel gas passage to the other end face thereof on the side of the exhaust gas exhaust passage.

2. A fuel cell as defined in claim 1, wherein the unit cell has a rectangular plan-view configuration having four side faces;

the oxygen-containing gas passage extension portion and the fuel gas passage extension portion are formed in one of the four side faces;

an entrance opening of the oxygen-containing gas passage is defined in the opposite end face to the end face forming the oxygen-containing gas passage extension portion and the fuel gas passage extension portion; and an entrance opening of the fuel gas passage is defined in each of the end faces adjacent the end face forming the oxygen-containing gas passage extension portion and the fuel gas passage extension portion.

3. A fuel cell as defined in claim 1, wherein the projecting portions of the adjacent spacer members on the side of the exhaust gas exhaust passage are overlapped with each other to form an exhaust passage forming portion having a thickness corresponding to the sum of the distance between the adjacent unit cells and the thickness of the unit cell;

the exhaust passage forming portion defines a hole extending through the stacking direction of the unit cells and communicating with the exit opening of the oxygen-containing gas passage and the exit opening of the fuel gas passage; and a plurality of said holes are communicated to each other in the stacking direction to together form the exhaust gas exhaust passage.

4. A fuel cell as defined in claim 1, wherein said spacer member defines, in a face thereof contacting the adjacent unit cell, a groove to be filled with sealing material.

5. A fuel cell as defined in claim 4, wherein the unit cell has a rectangular plan-view configuration having four side faces;

the oxygen-containing gas passage extension portion and the fuel gas passage extension portion are formed in one of the four side faces;

an entrance opening of the oxygen-containing gas passage is defined in the opposite end face to the end face forming the oxygen-containing gas passage extension portion and the fuel gas passage extension portion; and an entrance opening of the fuel gas passage is defined in each of the end faces adjacent the end face forming the oxygen-containing gas passage extension port on and the fuel gas passage extension portion.

6. A fuel cell as defined in claim 1, wherein said spacer member comprises a portion of a cell holder, with the spacer member disposed between the adjacent unit cells for maintaining a distance therebetween.

7. A fuel cell as defined in claim 6, wherein said cell holder defines a cut-in portion for receiving each opened edge of the unit cell, said cut-in portion including a pair of opposed abutment faces against which the closed end faces of the unit cell inserted into the cut-in portion are placed in abutment;

said abutment faces are formed with inclinations relative to the stacking direction of the unit cells such that these opposed abutment faces extend closer to each other in the direction away from the respective opened edges of the unit cell; and at each of the opposed ends of the closed end faces of the unit cell, there being formed an inclined portion to be gaplessly fitted to the inclined abutment face.

8. A fuel cell as defined in claim 1, wherein said multi-layered cell assembly includes: a pair of pillar members disposed gaplessly adjacent a pair of closed end faces of the unit cell, said pillar member having a thickness substantially corresponding to the thickness of the unit cell and a length longer than the length of the unit cell; and a pair of spacer members disposed gaplessly adjacent a pair of opened edges of the unit cell, said spacer member having a length longer than the length of the unit cell;

opposed ends of each said pillar member being placed over opposed ends of each said spacer member;

said unit cell and said pair of pillar members disposed gaplessly adjacent the closed end faces of the unit cell being placed over said pair of spacer members;

said fuel gas passage extension portion comprising a through portion defined in one of said pair of spacer members; and said oxygen-containing gas passage extension portion being formed between the adjacently stacked spacer members.

9. A fuel cell as defined in claim 1, wherein a plurality of the through portions are formed in series.

10. A fuel cell comprising:

a multi-layered cell assembly including a stacked plurality of unit cells, each unit cell including a substantially planar electrolyte layer having an oxygen electrode on one face thereof and a fuel electrode on the other face thereof, an oxygen-containing gas passage facing the oxygen electrode and a fuel gas passage facing the fuel electrode;

a plurality of the unit cells being stacked with a distance therebetween such that the fuel gas passage or the oxygen-containing gas passage is formed between each adjacent stacked pair of unit cells, thus forming the multi-layered cell assembly;

an exhaust gas exhaust passage formed adjacent end faces of the stacked unit cells;

the oxygen-containing gas passage configured to discharge oxygen-containing gas to the exhaust gas exhaust passage;

a fuel gas passage configured to discharge fuel gas to the exhaust gas exhaust passage;

the oxygen-containing gas passage including an oxygen-containing gas passage extension portion for forming an oxygen-containing gas passage exit opening remotely from the end face of the unit cell;

the fuel gas passage including a fuel gas passage extension portion for forming a fuel gas passage exit opening remotely from the end of the unit cell;

the multi-layered cell assembly including a pair of pillar members disposed gaplessly adjacent a pair of closed end faces of the unit cell, each pillar member having a thickness substantially corresponding to a thickness of the unit cell and a length longer than a length of the unit cell, with a pair of spacer members disposed gaplessly adjacent a pair of opened edges of the unit cell, the spacer members having a length longer than the length of the unit cell;

opposed ends of each pillar member being placed over opposed ends of each spacer member;

the unit cell and the pair of pillar members disposed gaplessly adjacent the closed end faces of the unit cell being placed over the pair of spacer members; and the fuel gas passage extension portion or the oxygen-containing gas passage extension portion comprising a through portion defined in one of the pair of spacer members.

11. A fuel cell as defined in claim 10, wherein said multi-layered cell assembly is mounted on a mounting table, said mounting table mounts thereon an angular cylindrical member having a closed top and an opened bottom and accommodating therein said multi-layered cell assembly, with said opened bottom of said cylindrical member being oriented downwards.

* * * * *